(12) United States Patent
Lin

(10) Patent No.: US 7,242,423 B2
(45) Date of Patent: Jul. 10, 2007

(54) LINKING ZONES FOR OBJECT TRACKING AND CAMERA HANDOFF

(75) Inventor: Yun-Ting Lin, Ossining, NY (US)

(73) Assignee: Active Eye, Inc., Pleasantville, NY (US)

(*) Notice: Subject to any disclaimer, the term of this patent is extended or adjusted under 35 U.S.C. 154(b) by 760 days.

(21) Appl. No.: 10/637,728

(22) Filed: Aug. 8, 2003

(65) Prior Publication Data
US 2004/0252194 A1  Dec. 16, 2004

Related U.S. Application Data

(60) Provisional application No. 60/478,938, filed on Jun. 16, 2003.

(51) Int. Cl.
*H04N 5/225* (2006.01)
*G06K 9/00* (2006.01)

(52) U.S. Cl. .................... 348/169; 382/154
(58) Field of Classification Search ........... 348/169, 348/143, 159, 154, 211.8, 211.9; 382/154
See application file for complete search history.

(56) References Cited

U.S. PATENT DOCUMENTS

| | | | |
|---|---|---|---|
| 5,280,530 A | | 1/1994 | Trew et al. |
| 5,745,126 A | * | 4/1998 | Jain et al. .................... 382/154 |
| 6,263,088 B1 | | 7/2001 | Crabtree et al. |
| 6,359,647 B1 | * | 3/2002 | Sengupta et al. ........... 348/154 |
| 6,661,450 B2 | * | 12/2003 | Yata .......................... 348/169 |
| 6,809,760 B1 | * | 10/2004 | Takagi et al. ............ 348/211.9 |
| 6,909,458 B1 | * | 6/2005 | Suzuki et al. ............ 348/211.8 |

OTHER PUBLICATIONS

"Linking Tracked Objects That Undergo Temporary Occlusion", Brodskey et al., concurrently filed.
Kettnaker and Zabih, "Bayesian Multi-Camera Surveillance", IEEE Proc. Computer Vision and Pattern Recognition, 1999 II: 253-259.

* cited by examiner

*Primary Examiner*—Gims Philippe
(74) *Attorney, Agent, or Firm*—Robert M. McDermott, Esq.

(57) ABSTRACT

Linked zones define the temporal and spatial relationships among multiple zones of a surveillance area, and are used to model an object's disappearance from one zone, for potential reappearance at another zone. One or more zones are defined within each camera's field of view. Two zones are linked if an object that disappears from one zone is capable of appearing in the other zone. Each link has an associated delay parameter or function that characterizes the time delay, if any, between a disappearance and subsequent appearance. For each zone, a set of other zones that are linked to this zone is maintained. When an object disappears from a zone, the set of other zones that are linked to this zone is used to reduce the search space for object appearances corresponding to this disappearance. When the corresponding object appearance is found, the tracking function is handed-off to the tracking module associated with the zone in which the object appeared.

27 Claims, 2 Drawing Sheets

LINKING ZONES FOR OBJECT TRACKING AND CAMERA HANDOFF

This application claims the benefit of U.S. provisional patent application 60/478,938, filed 16 Jun. 2003.

GOVERNMENT INTERESTS

This invention was made with United States Government support under cooperative agreement number 70NANB3H3049 awarded by the National Institute of Standards and Technology (NIST). The United States Government has certain rights in the invention.

BACKGROUND OF THE INVENTION

1. Field of the Invention

This invention relates to the field of video surveillance, and in particular to a system and method for tracking objects that traverse the fields of view of multiple cameras.

2. Description of Related Art

Video surveillance systems often include object-tracking capabilities, wherein an identified object, or target, is continually identified as the object travels within a scene, or set of scenes. Generally, multiple objects are simultaneously tracked. The objects may include people, vehicles, parcels, and so on.

In a typical surveillance system, multiple cameras are strategically placed to optimize the video coverage provided. As an object traverses a camera's field of view, an object-tracking module searches each sequential image frame for the target, based on the appearance of the target within a prior image frame. The appearance of the target in each sequential frame will not generally be identical to its appearance in the prior frame, due to changes in the object's posture and orientation as it moves, or due to changes in lighting conditions, camera angle, as the object enters different areas, and so on. Generally, the amount of change from frame to frame is limited, and the identification of a similar, albeit not identical, object in each sequential frame is fairly straightforward.

Object-tracking becomes more difficult if a target disappears from a scene, then reappears in a different scene. Such a disappearance-then-reappearance can occur, for example, as the target traverses from one camera's field of view to another camera's field of view, as the target exits through a door from one surveillance area to another, as the target enters then exits a non-surveilled area, such as a rest-room, closet, or stairwell, and so on. The difficulty arises from the fact that the target's reappearance differs in time and/or space from when and/or where it disappeared. The lighting conditions may differ on each side of a doorway, the target may change appearance while out of sight, the camera angles may differ, a different object may appear in the other scene, while the target is still out of sight, and so on. The difficulty is further compounded because some objects may disappear and not re-appear in a scene, for example when a target leaves the surveilled area, or areas, entirely.

A variety of techniques have been developed to facilitate the tracking of objects as they enter and exit the fields of view of multiple cameras. Generally, these techniques include a prediction of which camera's field of view will next contain the target, so that the tracking function can be "handed-off" to the images from this next camera. Many of these techniques rely upon an overlap of the fields of view, so that the principles of conventional frame-to-frame image tracking algorithms can be applied. Other techniques rely upon a mapping of the fields of view to a model of the physical environment, and a corresponding mapping of a target's trajectory within this physical environment. U.S. Pat. No. 6,359,647, "AUTOMATED CAMERA HANDOFF SYSTEM FOR FIGURE TRACKING IN A MULTIPLE CAMERA SYSTEM", issued 19 Mar. 2002 to Soumitra Sengupta, Damian Lyons, Thomas Murphy, and Daniel Reese, discloses a system for automatic camera handoff and is incorporated by reference herein. The approximate physical location of an object is determined from the displayed image using object tracking. The system determines which cameras' potential fields of view contain the object by determining whether the object's determined physical location lies within the bounds of each camera's field of view. When the object is at the bounds of the selected camera's field of view, the system automatically selects another camera and communicates the appropriate information to the figure tracking process to continue the tracking of the figure using this other camera. To properly map the object's trajectory to the physical environment based on images of the object from a camera generally requires a "calibration" of the camera to the physical environment.

In "BAYESIAN MULTI-CAMERA SURVEILLANCE", Proceedings of Computer Vision and Pattern Recognition, 1999 II:253–259, V. Kettnaker and R. Zabih describe an object-tracking system wherein a "chain of appearances" is created for a tracked object as the object traverses the fields of view of multiple cameras. In addition to using the visual data, the system uses a stochastic model that mathematically expressed how likely it was that an object last seen in one camera would be observed next in a different camera at a particular time. To facilitate the tracking of multiple objects, the image information from all of the cameras is stored in a common database, and various possible object paths are postulated. Using a Bayesian model, the optimal solution is the set of object paths with the highest posterior probability, given the observed data. The maximum a posteriori solution is approximated using linear programming techniques.

BRIEF SUMMARY OF THE INVENTION

It is an object of this invention to provide a method and system that facilitates camera handoff in a multiple camera surveillance system that does not require a calibration of each camera. It is a further object of this invention to provide a method and system that facilitates camera handoff that does not require overlapping camera fields of view. It is a further object of this invention to provide a method and system that facilitates camera handoff that can be set up easily and efficiently in a variety of environments.

These objects, and others, are achieved by creating "linked zones" that couple zones within the fields of view of multiple cameras. These linked zones define the temporal and spatial relationships among multiple zones of a surveillance area, and are used to model an object's disappearance from one zone, for potential reappearance at another zone. One or more zones are defined within each camera's field of view. Two zones are linked if an object that disappears from one zone is capable of appearing in the other zone. Each link has an associated delay parameter or function that characterizes the time delay, if any, between a disappearance and subsequent appearance. For each zone, a set of other zones that are linked to this zone is maintained. When an object disappears from a zone, the set of other zones that are linked to this zone is used to reduce the search space for object appearances corresponding to this disappearance. When the corresponding object appearance is found, the tracking function is handed-off to the tracking module associated with the zone in which the object appeared.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
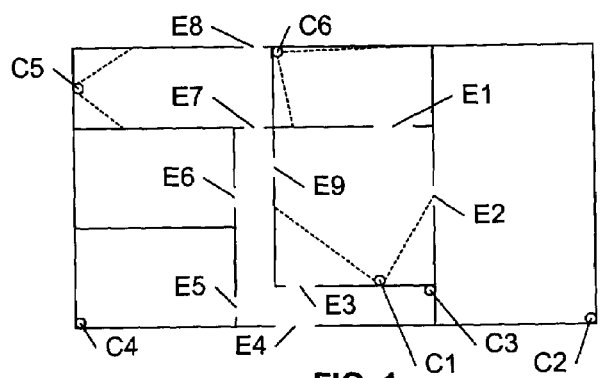
FIG. 1 illustrates an example floorplan of a multiple-camera surveillance area.

FIG. 1 illustrates an example floorplan of a multiple-camera surveillance area. The floorplan illustrates areas connected by egresses E1–E9 Disposed about the surveillance area are cameras C1–C6. The field of view of two of the cameras, C1 and C5, are illustrated as dashed lines on the floorplan.

Any of a variety of techniques can be used to track one or more objects within a field of view of a camera. As an object traverses the camera's field of view, an object-tracking module searches each sequential image frame for the target, based on the appearance and/or the motion pattern of the target within a prior image frame. The appearance of the target in each sequential frame will not generally be identical to its appearance in the prior frame, due to changes in the object's posture and orientation as it moves, or due to changes in lighting conditions, camera angle, as the object enters different areas, and so on. Generally, the amount of change from frame to frame is limited, and the identification of a similar, albeit not identical, object in each sequential frame is fairly straightforward. U.S. Pat. No. 5,280,530, "METHOD AND APPARATUS FOR TRACKING A MOVING OBJECT", issued 18 Jan. 1994 to Trew et al., and U.S. Pat. No. 6,263,088, "SYSTEM AND METHOD FOR TRACKING MOVEMENT OF OBJECTS IN A SCENE", issued 17 Jul. 2001 to Crabtree et al., are examples of such techniques, and are incorporated by reference herein.

Figure 3:
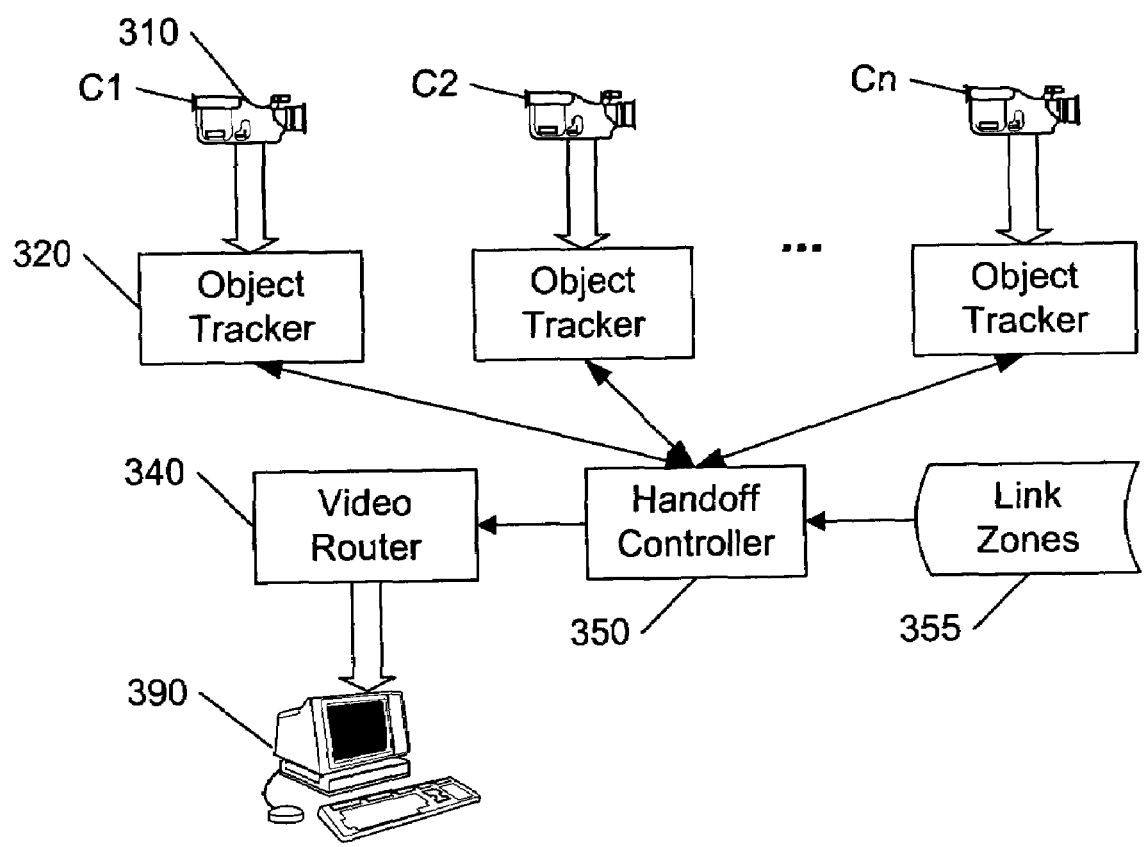
FIG. 3 illustrates an example multiple-camera surveillance system in accordance with this invention.

A multi-camera surveillance system of this invention, such as illustrated in FIG. 3, discussed further below, is configured to also track one or more objects as they travel into and out of the fields of view of the distributed cameras C1–C6. As a target object traverses from one camera's field of view to another camera's field of view, the tracking of the target is "handed off" to the object-tracking module associated with the other camera; or, equivalently, the video stream from the other camera is routed, or "handed off", to the tracking module associated with tracking the target. The transition of an object from one camera's field of view to another is generally marked by a disappearance from the first camera's field of view and a reappearance in the other camera's field of view. These disappearances and appearances are generally related in time, but need not be immediately sequential, or even in a particular order. If two cameras have overlapping fields of view, the appearance in the second camera's field of view will occur prior to the disappearance from the first camera's field of view; if the fields of view are not coincident with each other, there will generally be a delay between the disappearance and subsequent appearance.

In accordance with this invention, the field of view of each camera is defined to contain one or more "zones", to and from which objects may appear and disappear. If a physical path exists for an object to traverse from one zone to another, these zones are defined to be "linked". By defining linked zones, the task of tracking an object is substantially reduced in complexity, because the number of camera views, and/or the number of regions within a camera's view, that need to be searched for a target that disappears from one camera's field of view is limited to the zones that are linked to the zone of disappearance.

Figure 2A:
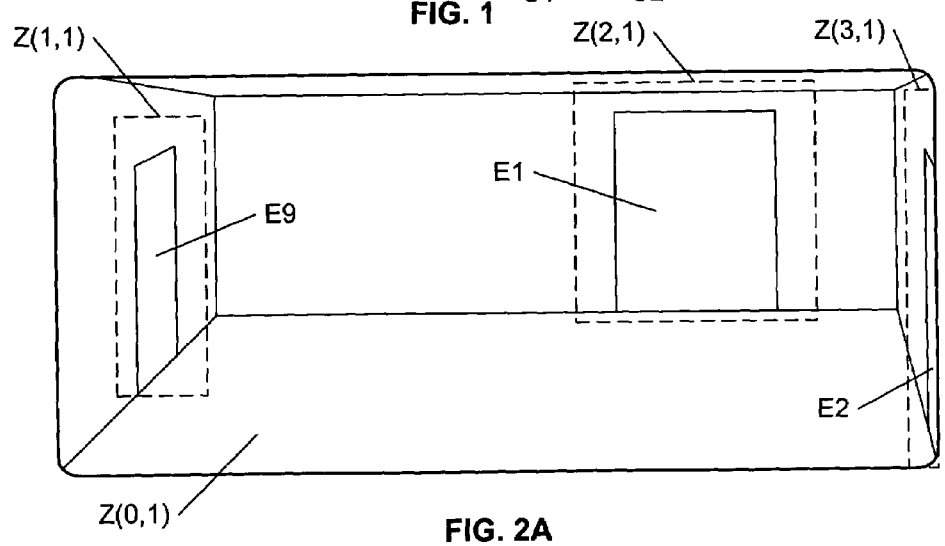
FIGS. 2A, 2B, and 2C illustrate example camera images with identified zones in accordance with this invention.
Figure 2B:
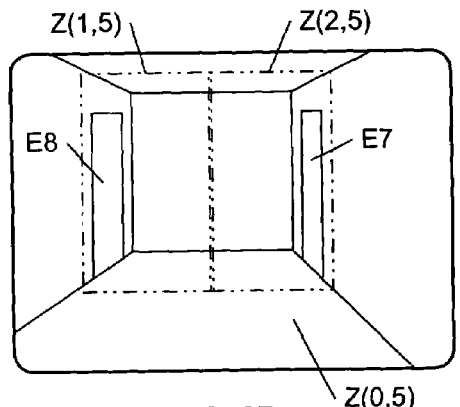
Figure 2C:
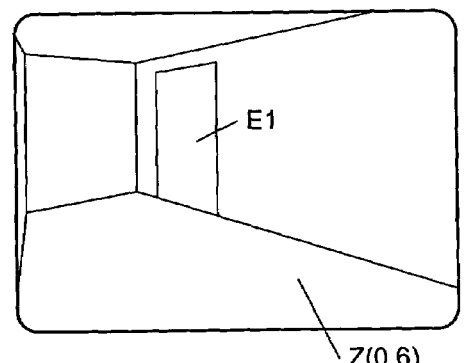

FIGS. 2A, 2B, and 2C illustrate example images from the fields of view of cameras C1, C5, and C6 of FIG. 1, respectively, with identified zones in accordance with this invention. Each zone is identified as $Z(i,j)$, where i identifies a zone within the field of view of camera j. Zone $Z(1,1)$, for example, identifies a zone in the field of view of camera C1 surrounding the egress E9. In like manner, zone $Z(2,1)$ encompasses egress E1 in the field of view of camera C1, and zone $Z(3,1)$ encompasses the part of egress E2 that is included in the field of view of camera C1. Any of a variety of techniques may be used to define each zone; the zones may overlap or may not. In a preferred embodiment of this invention, the view from each camera is displayed on an interactive terminal, and the user uses a pointing device, such as a mouse or stylus, to identify each zone by clicking and dragging defining boxes. Rectangular zones are preferred, for ease of processing, but any shape may be used to define each zone. The consideration for defining zones may also include aspects relative to other features of the security system. For example, in FIG. 2A, the zone $Z(1,1)$ can be extended to adjoin or overlap zone $Z(2,1)$, if this extension eases the basic tracking process.

For convenience, a default zone $Z(0,j)$ for each camera j is defined as any area in the field of view of the camera j that is not included in any explicitly defined zone $Z(i,j)$, where i>0. Thus, zone $Z(0,1)$ corresponds to all of the area in camera C1's field of view that is not included in zones $Z(1,1)$ $Z(2,1)$, and $Z(3,1)$. In FIG. 2B, two zones $Z(1,5)$ and $Z(2,5)$ are explicitly defined, and zone $Z(0,5)$ corresponds to the area in camera C5's field of view that is not included in these two zones. In FIG. 2C, there are no explicitly defined zones, and thus default zone $(0,6)$ corresponds to the entire field of view of camera C6. Note that although the illustrated zones each encompass an egress, zones within a camera's view can also be defined to identify each side of a structure that causes occlusions of objects as they travel past the structure, or to identify each side of the field of view to distinguish departures and arrivals from different directions, and so on.

Referring to FIG. 1, egress E1 provides a physical connection between the area in the field of view of camera C1 and the area in the field of view of camera C6. With specific regard to FIGS. 2A and 2C, an object that traverses egress E1 from the area in the field of view of camera C1 will be in zone $Z(2,1)$ before the traversal, and will appear in zone $Z(0,6)$ after the traversal. Thus, zones $Z(2,1)$ and $Z(0,6)$ are defined as being linked. Zone $Z(2,1)$ is also linked to zone $Z(0,1)$, however this linkage would not correspond to a disappearance/appearance event, per se. If a target travels across zone $Z(2,1)$ without traversing egress E1, it will remain in the field of view of the camera C1, and the object tracker associated with camera C1 will not register a "disappearance" and/or an "appearance" of the target as long as the target remains within the field of view of the camera C1, and thus zones $Z(0,1)$ and $Z(2,1)$ need not be linked, for the purposes of tracking objects as they disappear and reappear from camera views.

In like manner, egress E9 provides a connection between the area in the fields of view of camera C1 and the areas in the fields of view of cameras C3 and C5 (via egress E7). Thus, zone $Z(1,1)$ is defined to be linked to corresponding zones of cameras C3 and C5. As illustrated in FIGS. 2A and 2B, zone Z(1,1) would be linked to zone Z(2,5); the specific zone Z(i,3) corresponding to a view of the "hallway" leading to egress E9 is not illustrated.

Note that the area in the field of view of camera C4 is also accessible via egresses E9 and E5, but the target object would appear in the field of view of camera C3 before traversing egress E5, and thus a zone of camera C4 would not be considered to directly linked to zone Z(1,1). However, such indirect connections may optionally be considered to provide linked zones, in the event that the target is temporarily occluded from the view of camera C3 as it traverses egress E5. In like manner, zone Z(1,1) may be considered linked to zone Z(0,1), to facilitate tracking of a target that might exit via egress E9, reenter via egress E3, and reenter the field of view of camera C1.

Note, also, that zone Z(1,1) is necessarily linked to itself, because the target may exit and reenter zone Z(1,1) via egress E9. By default, in a preferred embodiment of this invention, each zone is considered to be linked to itself.

For each zone, a list is maintained of each of its linked zones. Generally, except in the case of forced one-way traffic, the list applies to both disappearances and appearances. For forward tracking, when a target disappears from one zone, each of the linked zones in its list is checked for a relatively contemporaneous appearance; for backtracking, when an object appears in a zone, each of the linked zones in its list is checked for a relatively contemporaneous disappearance.

FIG. 3 illustrates an example multiple-camera surveillance system 300 in accordance with this invention. In a preferred embodiment of this invention, each camera 310 has an associated object-tracking module 320, although a common object-tracking module with multiple video inputs may also be used. The object-tracking module 320 identifies objects that appear in the field of view of its associated camera 310, typically based on a set of criteria, such as size, color, shape, etc. that define objects of surveillance interest. Optionally, an operator of the system may specifically select the objects to be tracked by the system.

Each object-tracking module 320 reports the appearance or disappearance of each object to a handoff controller 350, along with the time and location of the appearance/disappearance in the field of view of its camera, and an identifier for locating a "description" of the object. Generally, the description is a set of parameters that are used to characterize the object for tracking purposes, using techniques common in the art.

The handoff controller 350 determines the zone corresponding to the location of the appearance/disappearance, based on the defined zones within each camera's field of view, and records the zone, the time of the appearance/disappearance, and the description identifier. Optionally, each object-tracking module 320 can be configured to determine the zone corresponding to the appearance, and send it directly to the handoff controller 350.

In a backtracking mode, the handoff controller 350 determines whether each new appearance corresponds to an existing target, by checking each zone 355 that is linked to the zone of appearance for a recent disappearance. If a recent disappearance has occurred in a linked zone 355, the description of the newly appearing object is compared to the description of the disappeared object, using techniques common in the art. If the description of the newly appearing object is determined to match the description of the disappeared object, the handoff controller 350 associates the tracking events corresponding to the disappeared object to the tracking events corresponding to the newly appearing object, thereby 'handing off' the tracking task from the object-tracking module 320 that was tracking the disappeared object to the object-tracking module 320 that is currently tracking the newly appearing object.

In a forward tracking mode, the handoff controller 350 determines whether each target disappearance corresponds to a new appearance, by checking each zone 355 that is linked to the zone of disappearance for a recent appearance. If a recent appearance has occurred in a linked zone 355, the description of the newly appearing object is compared to the description of the disappeared object. If the description of the newly appearing object is determined to match the description of the disappeared object, the handoff controller 350 associates the tracking events corresponding to the disappeared object to the tracking events corresponding to the newly appearing object, thereby 'handing off' the tracking task from the object-tracking module 320 that was tracking the disappeared object to the object-tracking module 320 that is currently tracking the newly appearing object.

As is common in the art, if the aforementioned description-comparison process results in multiple objects being matched to target object, the object having the most similarity to the target is generally selected as the matched object, or, if a substantial difference in similarity does not exist among multiple objects, multiple potential-handoffs are maintained until further information is obtained and/or until human intervention is provided to select from among the possible matches. As used herein, the term 'similarity' encompasses any of a variety of common characteristics between objects, including visual (e.g. color, texture, posture, position), temporal (e.g. time of appearance, disappearance), motion (e.g. speed, direction), and others.

In a typical embodiment, the handoff controller 350 is also coupled to a video router 340 that is configured to provide a continuous, or near-continuous, video tracking of a select target to a security console 390, or other device, such as a video recorder. When a newly appearing object is determined to match the target, video router 340 couples the video stream of the camera corresponding to the newly appearing object to the console 390.

Note that by partitioning a camera's field of view into zones, and defining linking zones, the number of disappearances and appearances that need to be compared is substantially reduced. For example, a reported disappearance from zone Z(2,1) need only be compared to recent appearances in zone Z(0,6); a reported appearance in zone Z(2,1) need only be compared to recent disappearances from zone Z(0,6) and Z(2,1). By reducing the number of comparisons that need to be made, the effectiveness as well as the efficiency of the video surveillance system is also improved, because the number of potential false-matches are also reduced.

A number of additional techniques may be employed to further improve the efficiency and effectiveness of associating appearances and disappearances in accordance with other aspects of this invention.

As noted above, when an object appears or disappears, "recent" disappearance or appearance events are checked. In a preferred embodiment of this invention, each linked zone may contain a time parameter that determines whether an event in one zone is "recent" relative to the corresponding event in another zone. For example, a disappearance from zone Z(3,1) of FIG. 2A will correspond to an immediate appearance at the corresponding zone of camera C2, and the definition of "recent" for this linkage can be set to a few seconds. Conversely, an appearance at zone Z(1,1) may correspond to a disappearance from a zone of camera C3 that occurred minutes before, and the definition of "recent" for this linkage would be set to a few minutes.

In like manner, the time parameter, or another parameter, may define an order of events. For example, assuming that egress E1 is an open doorway, an object will appear in zone Z(0,6) before it disappears from zone Z(2,1); whereas, an object from zone Z(1,1) cannot appear in a zone of camera C3 before it disappears from zone Z(1,1).

In the general case, a probability distribution function may be defined for each linked zone, defining the likelihood that an event at one zone at time T corresponds to an event at the linked zone at time T+t. In a preferred embodiment, this likelihood is defined based on the defined environment, then optionally refined based on observed durations of zone traversals. This likelihood can be used independently to prioritize the comparisons of "recent" events at each linked zone, or it may be used in combination with the measure of similarity between the descriptions of the disappearing and appearing objects in the selection of the most likely matching object. Optionally, it can be used selectively, for example, only when choosing between closely matching multiple objects, or only when the processing load of the system exceeds an overload threshold.

Other parameters may also be associated with each linked zone. For example, an "image change" flag may be used to identify zone transitions within which an object's image may be changed. For example, as a person travels from zone Z(1,1) to a zone of camera C3, the person may put on a coat or otherwise change appearance. Conversely, as a person travels from zone Z(2,1) to zone Z(0,6), a major change of appearance is not feasible. In a preferred embodiment, the image change flag is used to affect the process used to compare the descriptions of the objects, to broaden the scope of possible matches in the first example, and narrow the scope in the second example. Similarly, a flag may be used to indicate a change of orientation of camera images between zones. For example, a person exiting zone Z(2,1) will likely be viewed from the rear by camera C1, and viewed from the front by camera C6.

A direction parameter may also be associated with each appearance or disappearance to further reduce the scope of comparisons. For example, an object that disappears from zone Z(2,1) traveling to the left will appear in zone Z(0,6) traveling to the right. Objects that appear in zone Z(0,6) traveling left need not be compared to objects that disappear from zone Z(2,1) traveling left, and vice versa.

Other techniques for characterizing linked zones, or characterizing appearance and disappearance events at each zone, may also be used. For example, copending U.S. patent application "LINKING TRACKED OBJECTS THAT UNDERGO TEMPORARY OCCLUSION", Ser. No. 10/638,021, concurrently filed for Tomas Brodsky and Yun-Ting Lin, and incorporated by reference herein, discloses characterizing regions of an environment by the likelihoods of transition of a target from each region to another. The likelihoods of transition between regions are preferably used in combination with conventional object-tracking algorithms to determine the likelihood that a newly-appearing object in a scene corresponds to a recently-disappeared target. The likelihoods of transition may be predefined based on the particular environment, or may be determined based on prior appearances and disappearances in the environment, or a combination of both. The likelihoods of transition may also vary as a function of the time of day, day of the week, and other factors that may affect the likelihoods of transitions between regions in the particular surveillance environment. In combination with this invention, a likelihood of transition can be associated with each of the linked zones. For example, zones Z(2,1) and Z(0,6) would be defined as having a transition probability of 1.0, whereas zones Z(1,1) and Z(2,5) would be defined as having a transition probability of less than 1.0, corresponding to the likelihood that the object traverses both E7 and E9. In a preferred embodiment, "directional" likelihoods are associated with each linked zone. For example, the likelihood of an object disappearing from zone Z(2,5) and appearing at zone Z(1,1) may differ from the likelihood of an object disappearing from zone Z(1,1) and appearing at zone Z(2,5).

The foregoing merely illustrates the principles of the invention. It will thus be appreciated that those skilled in the art will be able to devise various arrangements which, although not explicitly described or shown herein, embody the principles of the invention and are thus within its spirit and scope. For example, although this invention is presented as a "stand-alone" system, the principles of this invention may be embodied in existing conventional systems to enhance their efficiency and effectiveness. In like manner, other existing or future techniques that facilitate camera handoff can be combined with the system of this invention. For example, the cited U.S. Pat. No. 6,359,647 patent teaches a tracking system that determines and/or predicts a real-world position of an object, and then points one or more pan/tilt/zoom camera toward this position. Deploying this invention to a multi-camera system having pan/tilt/zoom cameras, a disappearance from one zone could be used to point each corresponding camera to the location of each linked zone, in anticipation of a subsequent appearance. In like manner, although the invention is particularly well suited to a multiple-camera surveillance system, the principles presented herein are applicable to facilitate the tracking of an object in a single camera system wherein the field of view of the single camera includes obstacles that cause temporary occlusion of objects. These and other system configuration and optimization features will be evident to one of ordinary skill in the art in view of this disclosure, and are included within the scope of the following claims.

I claim:

1. A surveillance system for tracking objects, comprising:
  one or more object-tracking modules that are configured to detect a plurality of events corresponding to appearances and disappearances of objects in images corresponding to one or more fields of view of one or more cameras, and
  a handoff controller, operably coupled to the one or more tracking modules, that is configured to associate a first event with a second event of the plurality of events, based on locations of the plurality of events in the one or more fields of view,
  wherein
  each location of each events of the plurality of events is associated with a defined zone within a field of view of a camera of the one or more cameras, the first event thereby being associated with a first zone, and
  the first zone has an associated set of linked zones, the set of linked zones being based on a feasibility of an object in the first zone traversing to or from each of the zones in the set of linked zones,
  the handoff controller is configured to select the second event from among events occurring in the set of linked zones associated with the first zone.

2. The surveillance system of claim 1, wherein
  the handoff controller is further configured to select the second event based on a time duration between the first event and the second event.

3. The surveillance system of claim 2, wherein
  the set of linked zones of the first zone includes a time duration parameter corresponding to traversing between the first zone and each of the zones in the set of linked zoned, and
  the handoff controller is configured to select the second event based on the time duration between the first event and the second event relative to the time duration parameter corresponding to traversing between the first zone and the zone of the second event.

4. The surveillance system of claim 3, wherein the time duration parameter includes at least one of:
   a minimum traversal time,
   a maximum traversal time,
   a traversal time likelihood, and
   a probability distribution function of traversal time.

5. The surveillance system of claim 3, wherein the time duration parameter is based on observations of prior traversals between the first zone and each of the zones in the set of linked zones.

6. The surveillance system of claim 1, wherein the handoff controller facilitates defining the zones within the fields of view of the one or more cameras and defining the set of linked zones associated with the first zone.

7. The surveillance system of claim 1, wherein the set of linked zones of the first zone includes a likelihood parameter corresponding to traversing between the first zone and each of the zones in the set of linked zoned.

8. The surveillance system of claim 7, wherein the likelihood parameter is based on observations of prior traversals between the first zone and each of the zones in the set of linked zones.

9. The surveillance system of claim 1, wherein the first event corresponds to a first image, the second event corresponds to a second image, and the handoff controller selects the second event based also on a comparison of the first image and the second image.

10. The surveillance system of claim 1, further including the one or more cameras.

11. The surveillance system of claim 1, further including a video router, operably coupled to the handoff controller, that is configured to route images from the one or more cameras based on the association between the first event and the second event.

12. The surveillance system of claim 1, wherein the handoff controller is further configured to control at least one of the one or more cameras corresponding to the set of linked zones, based on the first event.

13. The surveillance system of claim 1, wherein the handoff controller is further configured to select the second event based on a comparison of a trajectory associated with the first event and a trajectory associated with the second event.

14. The surveillance system of claim 1, wherein the handoff controller is further configured to select the second event based on an order of occurrence of the second event relative to the first event.

15. A method of tracking a target object, comprising:
detecting a first event corresponding to an appearance or disappearance of a first object image,
determining a set of one or more other object images associated with other appearance or disappearance events,
comparing the first object image to the one or more other object images to select a second object image that matches the first object image, and
creating an association between a track of the first object image and a track of the second object image,
wherein
the first event corresponds to the appearance or disappearance of the first object image from a first zone of a field of view, and
determining the other events includes
   identifying each linked zone that is associated with the first zone, wherein each linked zone is based on a feasibility of an object traversing between the first zone and the linked zone, and
selecting the other events from events that occur at each linked zone.

16. The method of claim 15, wherein selecting the other events is based on a time duration between the first event and each of the other events.

17. The method of claim 16, wherein selecting the other events is based on a relationship between the time duration between the first event and each of the other events and a time duration parameter that is based on a traversal time between the first zone and each linked zone corresponding to each of the events.

18. The method of claim 17, wherein the time duration parameter is based on durations of prior traversals between the first zone and each linked zone.

19. The method of claim 18, wherein the time duration parameter includes at least one of:
   a minimum traversal time,
   a maximum traversal time,
   a traversal time likelihood, and
   a probability distribution function of traversal time.

20. The method of claim 15, further including facilitating defining at least one of the first zone and the linked zones within an image representing a field of view of a camera.

21. The method of claim 15, wherein selecting the second object image is further based on a likelihood parameter corresponding to traversing between the first zone and each linked zone.

22. The method of claim 21, wherein the likelihood parameter is based on observations of prior traversals between the first zone and each of the zones in the set of linked zones.

23. The method of claim 15, further including routing video streams from a plurality of cameras based on selecting the second object image.

24. The method of claim 15, further including controlling one or more cameras based on the first event.

25. The method of claim 15, wherein selecting the second object image is further based on a comparison of a trajectory associated with the first image object and a trajectory associated with the second image object.

26. The method of claim 15, wherein selecting the other events is further based on an order of occurrence of the first event relative to each of the other events.

27. The method of claim 15, wherein the first event corresponds to either an appearance or disappearance event, and each of the other events corresponds, respectively, to a disappearance or appearance event.

* * * * *